United States Patent [19]
Schluter

[11] 3,730,055
[45] May 1, 1973

[54] HYDRAULIC DRIVE FOR A TURNING CONNECTION WITH BALLS

[75] Inventor: Wilhelm Schluter, Dortmund-Gartenstadt, Germany

[73] Assignee: Hoesch Aktiengesellschaft, Dortmund, Germany

[22] Filed: Feb. 24, 1971

[21] Appl. No.: 118,278

[30] Foreign Application Priority Data

Feb. 26, 1970 Germany.....................P 20 08 931.0

[52] U.S. Cl. ..........................91/498, 92/28, 74/660
[51] Int. Cl. ............................F01b 1/06, F01b 13/06
[58] Field of Search........................91/491, 196, 176, 91/197, 498; 92/28; 74/660

[56] References Cited

UNITED STATES PATENTS

| 632,010 | 8/1899 | Gamble | 91/196 |
| 755,733 | 3/1904 | Barrow | 91/176 |
| 2,982,261 | 5/1961 | McClintock | 91/176 |

FOREIGN PATENTS OR APPLICATIONS

| 351,011 | 6/1931 | Great Britain | 91/176 |

*Primary Examiner*—Paul E. Maslousky
*Attorney*—Walter Becker

[57] ABSTRACT

A hydraulic drive for a rotary connection for use in connection with implements having a rotatable upper part and a non-rotatable lower part, in which the rotatable housing means of radial piston motor means are arranged in a chamber defined by inner ring means adapted to be connected to the non-rotatable lower part and by outer ring means adapted to be connected to the rotatable outer part while said housing means has outer teeth meshing with teeth of said inner ring means, and while said outer ring means comprises conduit means adapted to be connected to a source of pressure fluid and communicating with the interior of said radial piston motor means.

7 Claims, 2 Drawing Figures

Patented May 1, 1973  3,730,055

INVENTOR
Wilhelm Schlüter

HYDRAULIC DRIVE FOR A TURNING CONNECTION WITH BALLS

The present invention concerns a hydraulic drive for a turning connection with balls, which may be used as connecting element in devices having a rotatable upper part and a non-rotatable lower part. More specifically, a turning connection of the type involved comprises a stationary inner ring with inner teeth and a rotatable outer ring with one or two rows of balls while at least one hydromotor is employed which is mounted in the free inner space of the turning connection in a plane perpendicular to the axis of rotation of the connection.

With cranes and dredges it is known, between the upper and the lower carriage, to provide a turning connection with balls for rotating the upper carriage. In such an instance the turning connection is effected by an electric motor which with an interposed stepdown transmission acts upon a pinion which meshes with the teeth on the turning connection. In view of the occurring moment forces and the non-uniform stresses, there exists the danger that the teeth will break. Moreover, such drives require a relatively large space for mounting the various elements and, therefore, in most instances have to be installed above or below the plane of the bearing ring. In addition thereto, the mechanical or similar brakes necessary for braking purposes require additional space. These structural requirements represent an additional drawback. It may also be mentioned that frequently, for purposes of carrying out the various working operations, for instance, of a dredge, no mechanical transmission elements, such as chains, cables, or the like are employed, but pressure media have to be used. If with such devices corresponding pressure media are employed, it is expedient and advantageous to use such pressure media also for driving the transmission for the pivoting and turning movement of the upper structure without the interposition of a mechanical transmission.

Devices of this last mentioned design are known according to which hydraulically operable driving units are arranged in the interior of the turning connection employing balls and, more specifically, in such a way that the central range of the turning axle remains free for passing therethrough control conduits, linkages, etc.

It is, therefore, an object of the present invention to provide a hydraulic drive which excels by its simplicity and which will assure a fast and easy exchange of the driving unit while the transmission of the turning movement is effected as heretofore by means of gear rings with inner and outer teeth.

This object and other objects and advantages of the invention will appear more clearly from the following specification in connection with the accompanying drawing, in which.

Figure 1:
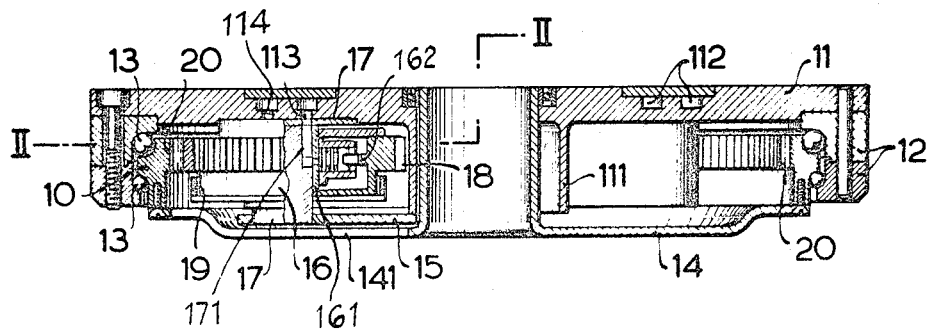
FIG. 1 represents a section through a turning connection with balls according to the invention which is equipped with a hydraulic drive, said section being taken along the line I—I of FIG. 2.

The hydraulic drive for a turning connection with balls according to the present invention, while employing at least one hydromotor is characterized primarily in that as hydromotor a radial piston motor is employed with outer teeth provided on its rotatable housing, which teeth mesh with the inner teeth of the inner ring of the drive while the still-standing rotor of the hydromotor is threadedly connected to a flange ring which is connected to the rotatable outer ring on the rotatable outer part of the device and rests on a counter plate which is held by a supporting member of the flange ring, said supporting member being provided with a braking unit operable to act upon the housing of the hydromotor. The annular passage for guiding the oil under pressure are provided in the flange ring. The braking unit is formed by a mechanical band brake while one rotating housing of the hydromotor which is equipped with outer teeth is simultaneously designed as brake drum for the brake unit.

Instead of using a band brake as braking unit, also shoe brakes may be employed and built into the hydromotor which shoe brakes, similar to the band brake, may be operated from the upper carriage of the device. If in this way the overall height of the hydromotor should exceed the height of the bearing, this will be of no importance because in most devices of the type involved sufficient space is available below the turning connection.

With the required high torques, it is frequently not possible to employ a single large hydromotor because the center of the bearing, i. e. the range of the ideal turning shaft, has to be left free for the control and driving elements. In such an instance it is necessary to employ a plurality of smaller hydromotors. In view of the property of these hydromotors it will be assured that all hydromotors will convey the same and a uniform torque upon the bearing.

Referring now to the drawing in detail, a ball turning connection as it is employed, for instance, as connecting means with a movable dredge between the undercarriage and a pivotable and turnable upper carriage comprises primarily a stationary inner ring 10 connected to the undercarriage and a multisectional outer ring connected to the rotatable upper carriage while a flange ring or upper section 11 is interposed therebetween. The pressure forces are conveyed through the intervention of balls 13 guided in two rows.

The inner ring 10 is screwed onto a bottom plate 14 which is supported by the undercarriage and is provided with openings 141. The openings 141 serve for installing and disassembling individual elements pertaining to the drive.

The flange ring or upper section 11 which forms a supporting member 111 extending into the inner chamber of the ball turning connection carries a counter plate 15 at the end of the supporting member 111. The flange ring 11 and the counter plate 15 receive the hydromotors arranged therebetween and serve as support so that the bending moments can be kept away from the base plate of the upper carriage. As hydromotors, radial piston motors may be employed with a rotatable housing 16 and a non-rotating central part 17 screwed to the flange ring 11. The circumference of housing 16 has its upper range provided with outer teeth 18, whereas the lower range forms a brake drum 19. The outer teeth 18 mesh with the inner teeth 20 of the inner ring 10.

Figure 2:
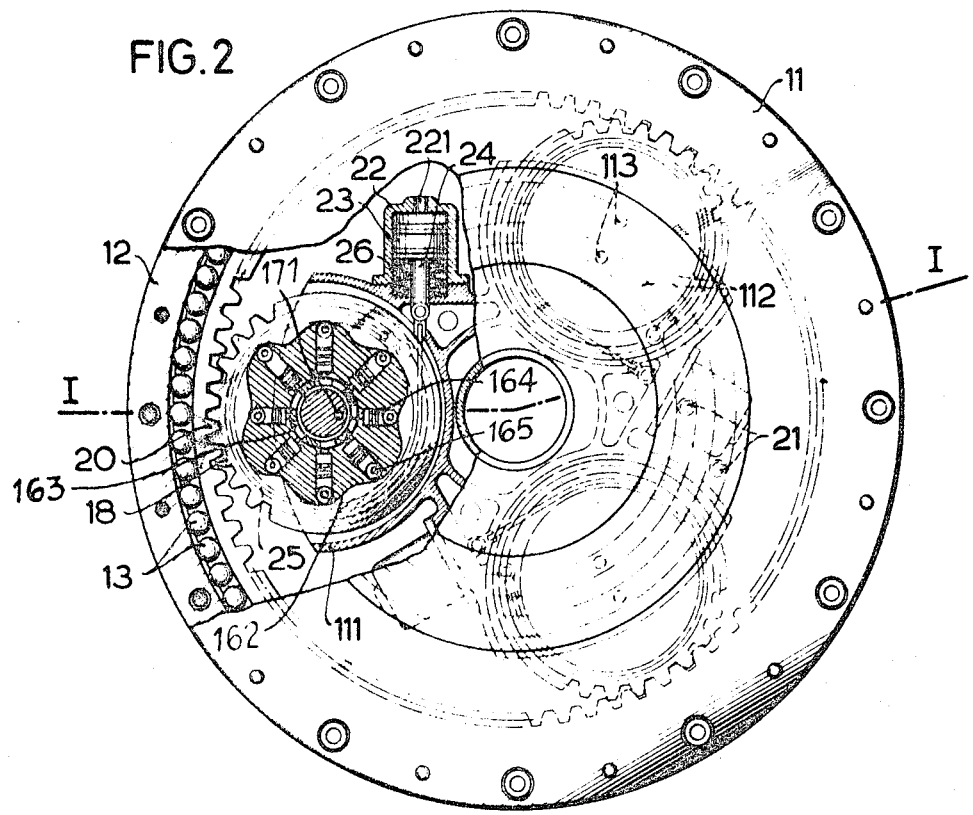
FIG. 2 is a section taken along the line II—II of FIG. 1.

The operational manner and arrangement of the hydraulic motors characterized as being of conventional type can be ascertained from sectioning particularly in FIG. 2. The hydraulic motor is embodied as a radial piston motor for the housing 16 serving as a rotating output member with an external gear or tooth means provided thereon; this external gear or tooth means 18 meshes with an internal gear or tooth means 20 provided on the inner ring 10 of of the base body 14 whereby the non-rotating central part or central means 17 of the hydraulic motor is screwed with the flange ring or upper section 11.

The upper side of the flange ring is provided with two annular passages 112 which receive oil under pressure through connections 21. This oil passes through bores 113 into the annular passage 112 of the flange ring 11 to the hydromotors.

For purposes of delaying the rotary movement, the supporting member 111 for each of the three hydromotors illustrated in the drawing is provided with a cylinder 22 which pertains to a band brake and which receives a mechanically hydraulically operable piston 23. Connected to the end of a piston rod 24 is a band brake 25 which is passed around the brake drum 19. The band brake is engaged by a spring 26 in cylinder 22 and is disengaged by means of oil under pressure which is conveyed through a cylinder bore 221 and which is adapted to act upon the piston 23.

The pressure oil flows, for example, through the inlet bore or passage 113 and flows out through the outlet or return bore or passage 114. The pressure oil passes further through the bore 171 and the slits 163 of the rotary slide valve 161 and then the piston surface of the piston 164. The outer end of the piston 164 has a roller 164 arranged thereon, which roller transmits the force effect of the piston 164 upon the cam ring 162. This cam ring 612 is rigidly connected with the housing 16 just the same as the rotary slide valve 161 is connected thereto. The necessary return slits are arranged between the slits 163 though in a different cross sectional plane and these are connected with the return bore or passage 114.

As will be evident from the above, the advantages realized by the present invention consist primarily in that the hydromotors are located directly in the plane of the bearing and, therefore, will not require any space above and below the bearing plane which space is required for other units. Furthermore, no additional driving pinions are necessary. The teeth of the bearings can be kept smaller because with the arrangement according to the invention a considerably greater degree of overlapping of the teeth is realized. By means of the openings of the bottom plate required for the installation and disassembly, which bottom plate is detachably connected to the stationary inner ring, it is possible to easily exchange the hydromotors.

It is, of course, to be understood that the present invention is, by no means, limited to the particular showing in the drawing but also comprises any modifications within the scope of the appended claims.

What I claim is:

1. A hydraulic drive for a rotary connection employing balls and to be used in connection with implements having a rotatable upper part and a non-rotatable lower part, which includes: inner ring means for connection to a non-rotatable lower part of an implement, said inner ring means having inner teeth, outer ring means for connection to a rotatable upper part of an implement, at least one circular row of balls interposed between said inner ring means and said outer ring means to permit rotation of said outer ring means relative to said inner ring means, said inner ring means and said outer ring means defining with each other chamber means, and radial piston motor means arranged in said chamber means and having rotatable housing means with outer teeth meshing with said inner teeth of said inner ring means, said radial piston motor means also including central means, and said outer ring means including an upper section having said central means connected thereto and having conduit means leading into said radial piston motor means and being adapted to be connected to a source of fluid under pressure.

2. A hydraulic drive according to claim 1, in which said upper section of said outer ring means has a supporting extension extending into said chamber means, and which includes supporting plate means supported by said supporting extension and in its turn supporting said central means of said piston motor means.

3. A hydraulic drive according to claim 2, in which said conduit means include two annular passages provided in the upper surface of said upper section of said outer ring means and provided with means for connection to a source of oil under pressure, and also includes bores extending through said upper section and establishing fluid communication between said annular passages and said piston motor means.

4. A hydraulic drive according to claim 3, which includes braking means arranged within said chamber means and operatively connected to said rotatable housing means.

5. A hydraulic drive according to claim 4, in which said braking means includes a hydro-mechanical band brake.

6. A hydraulic drive according to claim 5, in which said band brake comprises a brake drum forming part of said rotatable housing means.

7. A hydraulic drive according to claim 1, in which said radial piston motor means includes a plurality of radial piston motors arranged in evenly spaced relationship to each other along a circle around the center portion of said rotary connection.

* * * * *